3,542,563
MANUFACTURE OF CHEDDAR CHEESES USING A MILK COAGULATING ENZYME COMPLEX

Edward Donald Murray and Volker Ekkehard Gruetzner, London, Ontario, and Donald McLean Irvine, Guelph, Ontario, Canada, assignors to John Labatt Limited, London, Ontario, Canada
No Drawing. Filed June 21, 1967, Ser. No. 647,627
The portion of the term of the patent subsequent to Dec. 9, 1986, has been disclaimed
Int. Cl. A23c 19/02
U.S. Cl. 99—116                                                5 Claims

ABSTRACT OF THE DISCLOSURE

In manufacturing Cheddar cheese using as a milk coagulating agent an enzyme complex, the moisture content and firmness of the cheese can be maintained within the desirable limits generally obtained with rennet if during the holding of the curd at 102–104° F. a flash of heat of short duration is applied which quickly raises the temperature of the curd to about 110° F., the curd is held at this temperature for a short period of time and then quickly cooled to the regular holding temperature.

BACKGROUND OF THE INVENTION

Field of the invention

This invention relates to a method of manufacturing Cheddar cheeses, particularly of American and Canadian types.

Description of the prior art

A typical Cheddar cheese manufacturing procedure involves the following steps:

(1) A batch of pasteurized or unpasteurized whole milk is maintained at 86–90° F. and is inoculated with one or more species of lactic acid producing baceteria, such as *Streptococcus lactis, Streptococcus cremoris, Streptococcus acidophilus, Streptococcus thermophilus* and *Lactobacillus acidophilis*. The organisms are allowed to grow within the milk for about 30–60 minutes and in so doing produce an increase in acidity. This increase in milk acidity is normally about 0.01 to 0.02% when measured as titratable acidity.

(2) After the desired increase in acidity has been reached a milk coagulating agent, such as animal rennet, is stirred into the milk and then the system is allowed to stand unagitated for about 30 minutes. Coagulation is usually conducted at a temperature of about 88° F. and a gel-like coagulum is formed.

(3) When the coagulum reaches a desired degree of firmness, it is cut into small cubes of about ¼ or ⅜ inch.

(4) The curd and whey are then stirred and heated to a temperature of about 102–104° F. This cooking period normally requires about 30 minutes.

(5) The curd and whey ase stirred continuously for a further period of about 40–50 minutes while being held at the elevated temperature. During this period (referred to hereinafter as the holding stage) the effects of elevated temperature, increasing acidity and the coagulating agent all combine to influence the firming and drying of the curd particles and the separation of whey from these particles.

(6) After the curd paritcles have reached a desired degree of firmness and dryness, and the acidity has increased by about 0.02–0.03%, the curd is allowed to settle and the whey is drained from the vat.

(7) The total interval setting time and dipping (draining) time is about 2½ hours. The characteristic final steps of the Cheddaring procedure are then followed.

In the copending Murray et al. application, Ser. No. 598,191 filed Dec. 1, 1966, now U.S. Pat. No. 3,482,997, there is described a substitute for rennet. This rennet substitute is an enzyme complex containing a neutral peptidase and an acid peptidase (hereinafter referred to as a peptidase complex) which is preferably derived from the bacterium *Bacillus subtilis*.

When Cheddar cheeses were made according to the conventional process using the peptidase complex as coagulating agent, it was found that the resultant cheese had a moisture content of about 36.5–38.5%. Moisture content is a very important index as to quality in Cheddar cheese and is preferably maintained at about 35%. Higher moisture levels tend to produce cheeses which have a weak body, develop discoloration and possess off flavours. Accordingly, it was necessary to find a method for reducing the moisture content of the finished cheese.

When the peptidase complex is used in the production of cheese, the neutral peptidase is primarily involved in milk coagulation while the acid peptidase is primarily responsible for firming and drying of the curd. Studies were made on the factors affecting the activities of the neutral and acid peptidases and it was found that the two peptidases possessed maximum enzymic activities at different temperatures. Thus, the neutral peptidase was found to have maximum activity at about 115° F. (46° C.) while the acid peptidase showed maximum activity at about 129° F. (54° C.), when assayed as described in the previously noted copending application.

It was also found that because of differences in the heat activity characteristics of the two peptidases, a temperature increase from 103° F. to 110° F. caused an activation of the acid peptidase (firming enzyme) in excess of 30%, while the neutral peptidase (coagulating enzyme) was activated by less than 5%.

SUMMARY OF THE INVENTION

According to this invention it has been determined that in the production of Cheddar cheese using a milk coagulating enzyme complex as clotting agent, the moisture level of the cheese can be reduced by applying a flash of additional heat of short duration during the holding stage. The temperature of the curd is raised to about 105–115° F. during application of the flash of additional heat.

DESCRIPTION OF THE PREFERRED EMBODIMENT

During application of the flash of additional heat the temperature should be raised from the regular holding temperature as quickly as possible, maintained at the elevated temperature for a short time sufficient to stimulate syneresis and then depending on the starter organisms used, it may be quickly cooled to the normal holding temperature. The elevated temperature is preferably in the range of about 108–112° F. and is preferably maintained for not more than about 15 minutes. Usually the elevated temperature is maintained for a period of about 1–10 minutes. Particularly good results have been obtained at an elevated temperature of about 110° F. for a period of about 3 minutes. The main point to be realized in applying the flash of additional heat is that the temperature of the batch should be raised to the desired level and returned again to the normal level in order to obtain a desired degree of stimulation of syneresis with the least possible input of heat since this minimizes heat inactivation of the lactic acid producing bacteria.

The flash of additional heat is preferably applied during the first 15 minutes of the holding stage, after the batch reaches the maximum cooking temperature. However, the selection of the actual time during the holding stage for the application of the flash of additional heat can be varied considerably depending on the size of the batch, the size and capabilities of the equipment, etc.

Our invention will now be illustrated in detail in the following specific examples which illustrate the preferred procedure but do not limit the scope of the invention.

EXAMPLE 1

Production of cheese—pilot scale

Whole milk containing about 3.4% fat was pasteurized and cooled. One hundred and sixty pounds of this milk were placed into a two hundred pound capacity steam-jacketed vat and the temperature of the milk was adjusted to 88° F. One and one half percent (by weight) of conventional commercial starter culture was added and the milk was allowed to ripen until there was an increase in acidity of about 0.01 to 0.02%, this being obtained in about 30 minutes. After acid development 15.0 ml. of a peptidase complex were added to the milk. The peptidase complex was prepared according to the process of aforementioned Ser. No. 598,191 and was a complex of neutral peptidase and acid peptidase derived from the bacterium *Bacillus subtilis* having an activity such that 3 fluid ounces thereof coagulated 1000 pounds of milk. Coagulation resulted and a firm coagulum was produced.

When the milk was properly coagulated, it was cut into cubes with regular ¼ inch curd knives. The cut curd was agitated slowly to prevent breaking and matting of the soft particles. The cooking stage was started about ten minutes after cutting, and the curd and whey were heated to 103° F. within a period of about 30 minutes. During the holding stage a temperature of 103° F. was maintained until there was an increase in acidity of about 0.01 to 0.015%. This required an additional time of about 25 minutes.

After the increase in acidity, steam was re-applied to the jacket and the temperature of the curd and whey was raised to 108° F. within about 5 minutes. The temperature was maintained at 108° F. for about 10 minutes, after which cooling water was applied to the jacket and the temperature of the vat was adjusted to 103° F. within a period of about 5 minutes. When the curd was firm and dry, acidity had increased by 0.03% and then it was allowed to settle. The whey was then drained off and the normal cheddaring procedure was followed. The resulting cheese was of excellent texture and possessed a moisture content of about 35%.

EXAMPLE 2

Production of cheese—semi-commercial scale

Whole milk containing about 3.4% fat was pasteurized and cooled. Seven hundred pounds of this milk was pumped into a regular one thousand pound capacity steam-jacketed cheese vat and the temperature of the milk was adjusted to 88° F. One and one half percent (by weight) of conventional commercial starter culture were added and the milk was allowed to ripen until there was an increase in acidity of about 0.01 to 0.02%, this being obtained in about 30 minutes. After acid development, 2.1 fl. oz. of the peptidase complex employed in Example 1 were added to the milk. Coagulation resulted and a firm coagulum was produced.

When the milk was properly coagulated, it was cut in cubes with regular ¼ inch curd knives. The cut curd was agitated slowly to prevent breaking and matting of the soft particles. The cooking stage was started about ten minutes after cutting, and the curd and whey were heated to 103° F. within a period of about 30 minutes. During the holding stage a temperature of 103° F. was maintained until there was an increase in acidity of about 0.01 to 0.02%, this requiring an additional time of about 30 minutes.

After the increase in acidity, steam was re-applied to the steam-jacket and the temperature of the curd and whey was raised to 110° F. within about 5 minutes. The temperature was maintained at 110° F. for about 3 minutes after which cooling water was applied to the jacket to return the temperature of the vat content to 103° F. within a period of about 7 minutes. When the acidity had increased by 0.03% and the curd was firm and dry it was allowed to settle. The whey was then drained off and normal cheddaring procedure was followed. The resulting cheese was of excellent texture and had a moisture content of about 35%.

What we claim as our invention is:

1. In a process for manufacturing Cheddar cheese which comprises curding appropriately ripened milk by the activity of an enzyme complex obtained from *Bacillus subtilis* consisting of acid peptidase and neutral peptidase substantially free of alkaline peptidase, setting and cutting the curd, cooking the cut curd at a temperature of from about 102–104° F., holding the curd at the maximum cooking temperature, separating the curd from the whey, cheddaring, salting, pressing and finally curing the curd, the improvement which comprises flash heating during a portion of the holding stage to quickly raise the temperature of the curd and whey to about 108–112° F., maintaining this temperature for a short period of time within the range of 1–10 minutes sufficient for stimulation of syneresis and then quickly cooling the curd back to a normal cooking temperature prior to separation of the curd and whey.

2. The process according to claim 1 wherein the temperature of the curd is raised to about 110° F.

3. The process according to claim 1 wherein the temperature is maintained for about 3 minutes.

4. The process according to claim 2 wherein the temperature of about 110° F. is maintained for about 3 minutes.

5. The process according to claim 4 wherein the total holding stage has a duration of about 45 minutes and the temperature is raised to about 110° F. for a 3 minute period during the first 30 minutes of the holding stage.

References Cited

UNITED STATES PATENTS 3,212,905 10/1965 Arima et al. _____ 99—116

FOREIGN PATENTS 565,788 11/1944 Great Britain.
160,811 12/1954 Australia.

OTHER REFERENCES

Davis, J. G.: Cheese, vol. I, Basic Technology, 1965, American Elsevier Publ. Co. Inc., N.Y., pp. 30 and 31.

LIONEL M. SHAPIRO, Primary Examiner

D. M. NAFF, Assistant Examiner